US010453356B2

(12) United States Patent
Petrov

(10) Patent No.: US 10,453,356 B2
(45) Date of Patent: Oct. 22, 2019

(54) SYSTEM AND METHOD TO ASSIST A USER IN ACHIEVING A GOAL

(71) Applicant: Alexander Petrov, Sausalito, CA (US)

(72) Inventor: Alexander Petrov, Sausalito, CA (US)

(*) Notice: Subject to any disclaimer, the term of this patent is extended or adjusted under 35 U.S.C. 154(b) by 792 days.

(21) Appl. No.: 14/862,087

(22) Filed: Sep. 22, 2015

(65) Prior Publication Data
US 2016/0086509 A1   Mar. 24, 2016

Related U.S. Application Data

(60) Provisional application No. 62/053,668, filed on Sep. 22, 2014.

(51) Int. Cl.
G09B 19/00 (2006.01)
G06Q 10/10 (2012.01)

(52) U.S. Cl.
CPC .......... G09B 19/00 (2013.01); G06Q 10/10 (2013.01); G09B 19/0038 (2013.01); G09B 19/0092 (2013.01)

(58) Field of Classification Search
CPC ................. G09B 19/0038; G09B 19/0092
USPC ........................................... 434/127
See application file for complete search history.

(56) References Cited

U.S. PATENT DOCUMENTS

| | | | | |
|---|---|---|---|---|
| 5,454,721 A * | 10/1995 | Kuch | ................. | G06F 19/3475 434/127 |
| 6,287,560 B1 * | 9/2001 | Fujii | .................... | G09B 5/065 434/127 |
| 6,585,516 B1 * | 7/2003 | Alabaster | ........... | G09B 19/0092 128/921 |
| 8,363,913 B2 * | 1/2013 | Boushey | ................. | G06K 9/00 128/921 |
| 8,690,578 B1 * | 4/2014 | Nusbaum | ............... | G09B 19/00 128/905 |
| 2006/0036395 A1 * | 2/2006 | Shaya | ................ | G01G 19/4146 702/127 |
| 2007/0050058 A1 * | 3/2007 | Zuziak | ............... | G06F 19/3475 700/90 |
| 2010/0111383 A1 * | 5/2010 | Boushey | ................. | G06K 9/00 382/128 |
| 2011/0182477 A1 * | 7/2011 | Tamrakar | ............. | G06T 7/0002 382/110 |
| 2011/0236862 A1 * | 9/2011 | Culver | ................ | G06F 19/3475 434/127 |
| 2011/0318717 A1 * | 12/2011 | Adamowicz | ....... | G09B 19/0092 434/127 |
| 2012/0135384 A1 * | 5/2012 | Nakao | ................ | G09B 19/0092 434/127 |
| 2012/0179665 A1 * | 7/2012 | Baarman | ............ | G06F 19/3475 707/709 |

(Continued)

Primary Examiner — Samchuan C Yao
Assistant Examiner — Michael C Humphrey
(74) Attorney, Agent, or Firm — Buchalter, a professional corp.

(57) ABSTRACT

A system and method to facilitate lifestyle changes by providing support, motivation, progress/tracking, information, analysis. Exemplary embodiments include targeted suggestions for changes based on the individual's actual activity to increase the likelihood of a successful adoption. Exemplary embodiments may also include convenient mechanisms for entering information into the system for assessing and tracking the user's performance.

14 Claims, 5 Drawing Sheets

(56) References Cited

U.S. PATENT DOCUMENTS

| | | | |
|---|---|---|---|
| 2013/0216982 A1* | 8/2013 | Bennett | G09B 5/00 434/127 |
| 2013/0273509 A1* | 10/2013 | Mutti | G09B 19/0092 434/127 |
| 2014/0147829 A1* | 5/2014 | Jerauld | G06F 1/163 434/430 |
| 2014/0170608 A1* | 6/2014 | Ting | G06F 17/30271 434/127 |
| 2014/0221784 A1* | 8/2014 | Pacione | A61B 5/0022 600/301 |
| 2014/0315161 A1* | 10/2014 | Sako | G09B 19/0092 434/127 |
| 2015/0262497 A1* | 9/2015 | Landau | G09B 19/0038 434/247 |
| 2016/0035248 A1* | 2/2016 | Gibbs | G06T 7/0002 434/127 |

* cited by examiner

DPP goals
- ↓ 7% total bodywt
- less fat/Cal ; ↑ activity ; tracking
- 180 min exercise (risk) ⟶ 2.5 hrs eliptical 5-10

| A | s | m | h |
|---|---|---|---|
| s | 5 | 10 | 15 |
| m | 10 | 15 | 20 |
| h | 15 | 20 | 30 | swim 5-10 / Able
↑ to interval

Motivated

| | s | m | h |
|---|---|---|---|
| s | 5 | 10 | 12 |
| m | 10 | 12 | 15 |
| h | 12 | 15 | 20 |

Tennis 10-15

| M | s | m | h |
|---|---|---|---|
| s | 5 | 13 | 15 |
| m | 13 | 15 | 20 |
| h | 15 | 20 | 30 |

Yard Work

| M | s | m | h |
|---|---|---|---|
| s | 5 | 10 | 15 |
| m | 10 | 15 | 20 |
| h | 15 | 20 | 30 |

Rowing 10-15

| M | s | m | h |
|---|---|---|---|
| s | 5 | 10 | 12 |
| m | 10 | 12 | 15 |
| h | 12 | 15 | 20 |

Stand get up

| M | s | m | h |
|---|---|---|---|
| s | 2m/hm | 2/45 | 2/30 |
| m | 2/45 | 2/30 | 2min 20ml |
| h | 2ml 30min | 2min 20ml | 2m morning equal/launge |

Weights

| A | s | m | h |
|---|---|---|---|
| | 5 | 10 | 12 |
| | 10 | 12 | 15 |
| | 12 | 15 | 20 |

Immediate 2-5

| M | | | |
|---|---|---|---|
| | 30 sec | 1 min | 2 min |
| | 1 min | 2 min | 3 min |
| | 2 min | 3 min | 5 min |

| M | | | |
|---|---|---|---|
| | | | |
| | | | |
| | | | |

FIG. 5

SYSTEM AND METHOD TO ASSIST A USER IN ACHIEVING A GOAL

PRIORITY

This application claims priority to U.S. Application No. 62/053,668, filed Sep. 22, 2014, which is incorporated by reference in its entirety into this application.

BACKGROUND

Staying motivated to achieve a goal can be difficult for any person. Every year people make resolutions at the beginning of the year that are rarely ever fulfilled for more than just a fleeting time. Dieting, eating healthy, and exercising are of particular difficulty for those that are not accustomed to these habits already.

In many cases, poor dietary habits arise from ignorance of food compositions, such as calories, carbohydrates, and other contributing factors to high sugar, fat, and other properties that are disadvantageous to weight loss. Moreover, portion and serving sizes typically served by restaurants or self-administered are not commiserate with the health information provided on packages. Instead, these portions are generally much larger than for a single individual.

Conventional dietary programs require a person to track different factors or to eat prearranged items or portions. The user must measure out appropriate amounts, track numbers, and self-assess their progress. Even with associated support groups, such as on-line or group meetings, these programs lack individual attention or analysis from an outside perspective to identify areas of improvement for a user. Even if doctors, nutritionists, personal trainers, or dietary coaches are used, the interaction with these individuals is periodic and subject to the limitations of the individual's disclosures.

The difficulty is even greater when a health and dietary program are necessary to prevent certain health conditions. Many adverse health conditions may be improved, reduced, or eliminated with a proper diet and exercise. However, knowing what to do for a specific condition may be difficult. I many cases for people attempting to make an appropriate lifestyle change, they find that there was really no one that could support them to quickly find a path that was right for that individual. No one to help them save time and money on their journey to prevent the disease or condition. No one to help them stay motivated and on track with healthy habits for life.

BRIEF SUMMARY

Exemplary embodiments described herein include an easy-to-use program that puts a user in control and helps them stay on track with healthy habits-anytime, anywhere.

Exemplary embodiments described herein provide a user application accessible on an electronic device, such as a mobile device, that permits the user to: get a personalized program; track their progress; enjoy real time coaching support; join a small select group of peers for support; earn rewards and save on wellness brands; and any combination thereof. The application may incorporate motivation, education, and convenience/environment to increase a user's chance of success in adopting lifestyle changes to achieve their goals.

Exemplary embodiments include assessing an individual's actual activity and target activity and suggesting/encouraging minor changes toward their goal that can be adopted and maintained by a user. Therefore, exemplary embodiments provide a personalized approach, continued assessment, tracking, suggested trajectory based on the actual habits of the individual.

Exemplary embodiments include easy and convenient systems and methods for tracking a user's actual performance. For example, activity trackers, such as sleep timers, walker/running counters, etc., heart rate monitors, etc. may interface with the application to directly feed activity levels and other biological and health information directly to the program for storing, tracking, display, and assessing. Algorithms within the program or interfacing with the program may also be used to easily determine and track other factors of interest for the user. For example, a portion control, calorie counter, program may be incorporated such that a user simply needs to take a picture of a consumed product or label and the proper portion size and/or macro nutrient composition may be estimated. Other attributes may be suggested, such as consumed goods, dietary attributes, portion, calories, etc. A user interface may also be provided such that a user can manually enter in one or more pieces of information such as preferences, tracked characteristics (e.g. weight), activities, food intake, etc.

Exemplary embodiments may also provide a social and support platform such that a user may receive support when needed. Educational materials may also be supplied to a user through the application at relevant times in the individual's journey, such that the interaction with the application is personalized to the individual and their present, past, and anticipated trajectories.

BRIEF DESCRIPTION OF THE DRAWINGS

FIGS. 1-3 and 5 are exemplary features, algorithms, and premises supporting applications described herein.

DETAILED DESCRIPTION

Figure 1:
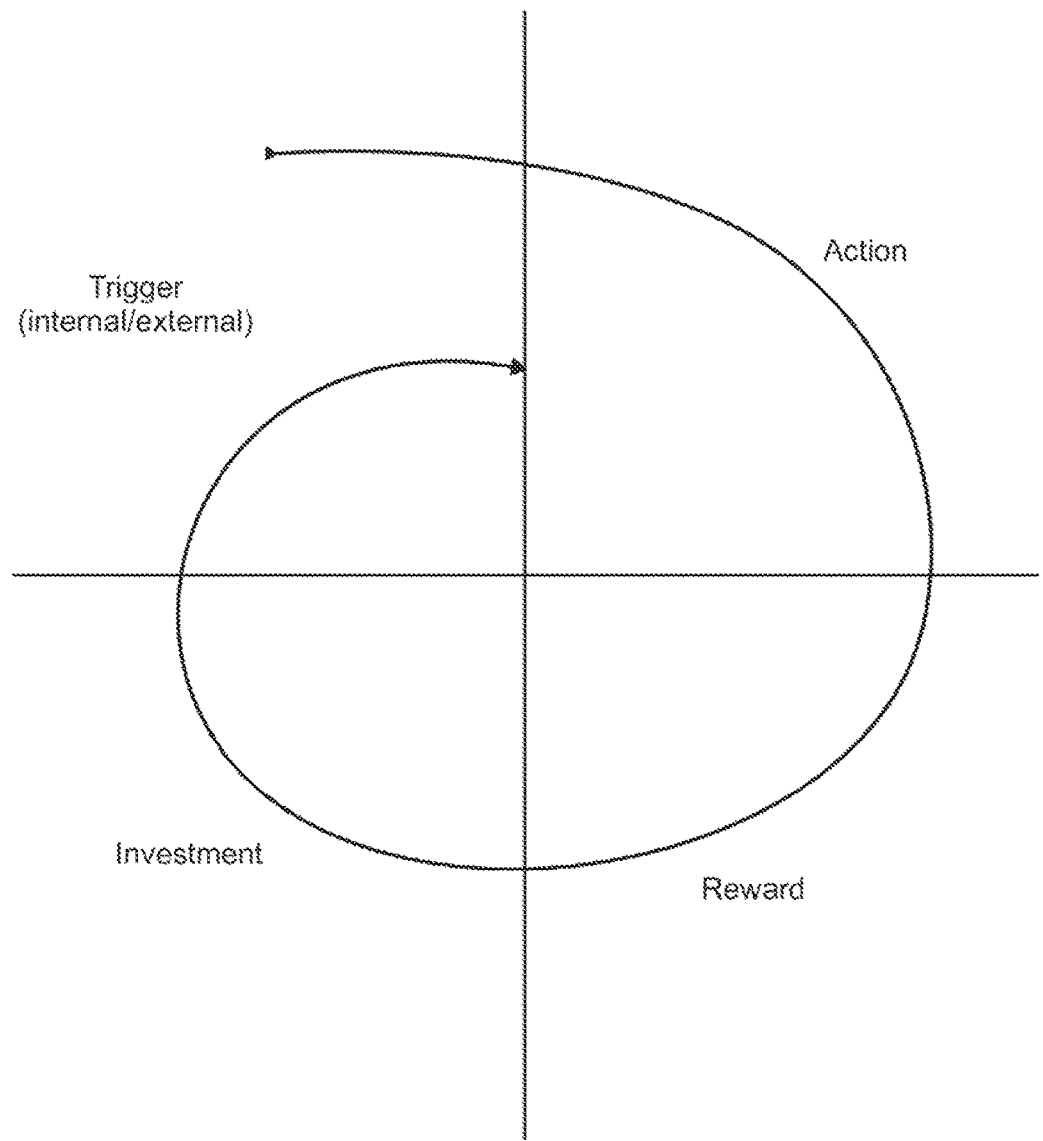

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments are described herein in terms of dietary and exercise programs to avoid type 2 diabetes. However, it should be understood that embodiments of this invention are not so limited, but are additionally applicable to other lifestyle changes necessary to improve a user's life and/or avoid other health conditions or diseases. Other applications may also benefit from one or more features described herein. Therefore, it is understood that any combination of features may be used for any desired purpose. For example, the sizing algorithm may be used to assess dressing sizes for a retail store. Furthermore, although embodiments of the invention may be described and illustrated herein in terms of a website application, it should be understood that embodiments of the invention are also applicable to other interfaces, such as mobile applications, portals, dedicated electronic devices, and configurations in which a consumer may input and receive information through an interface communicating through a network to a host system.

In an exemplary embodiment, a software platform enables a user to bring together conveniently and easily previously disconnected resources (support networks, information portals, tracking and logging activity and habit information, trajectory assessment, health care provider/coach/trainer involvement, payors (such as insurance providers) and combinations thereof) to be networked together. In an exemplary embodiment, a user may receive information, contact support networks, track dietary and activity levels, receive personalized information and trajectory or suggested behavioral changes, receive assessments and analysis of progress in real time or semi-real time.

In an exemplary embodiment, a user may download an application or access a website. The application may be resident on a mobile device, such as a cell phone. The application may comprise a user interface for receiving information from a user. Information may include biological and personal characteristics, such as gender, weight, health history, preferences, goals, perceived behaviors, etc.

The application may include one or more portals for receiving tracked information from a user. For example, the application may interface with one or more separate digital electronic devices, or may incorporate trackers into the mobile device directly. For example, information such as activity levels, sleep amounts and quality, step counters, calorie burned estimators, etc. may be used to automatically track a user's activity level and communicate with the application to receive, store, track, and display such activity.

The application may include one or more portals for analyzing and providing a personalized program for altering a user's lifestyle. The application may track desired activities and suggest further activities based on the actual success rates or previous habits already encountered. For example, the application may use a calendaring/reminder system to suggest activities such as walking. If the user's actual activity level indicates more success in a certain time of day, then the suggested additional activity may similarly be suggested around the corresponding time of day. If a certain activity is not adopted by a user, then alternative activities may be suggested until a successful adoption is made. Suggestions may be made based on information entered about a user, such as preferences, gender, age, physical health, etc., actual performance, such as adoption of other activities, and/or similar considerations of others having one or more characteristics in common with the user that may suggest a probable success for this individual user.

Educational and other information may be provided periodically and/or may be provided to coincide with successes and deficiencies in the actual performance of the user compared to the desired goals. For example, if a user is consuming higher levels of carbohydrates, then educational materials such as alternatives or how to identify foods with high carbohydrate content may be provided to the user.

The application may also include a support feature. In an exemplary embodiment, the user may communicate with a support network of other users, friends, family, and/or coaches, trainers, doctors, etc. The application may also provide an automatic support system that includes, for example, reminders, alerts, encouraging notes, music, and other inspirational or motivational mechanisms either periodically or in response to specific activities of a user. For example, reminders may be provided before or questions regarding completion of activities may be provided after scheduled activities. If activities are lagging in duration or skipped, alternatives may be suggested, encouraging messages or music may be provided, or a support person or network contacted or alerted to provide in person contact and encouragement.

The application may include a portion control features or dietary tracker that logs information about the user's dietary intake. In an exemplary embodiment, the portion control permits a user to take a picture of a meal about to be consumed. The application may then assess a proper portion control and provide feedback to the user on an appropriate quantity to consume. The portion control may work on a macro level and determine an entire portion based on plate size, or quantity by identifying an outer perimeter of food on a plate and assessing a general appropriate amount. The user and/or program may also identify specific food types and/or individual portions within an overall mean, such that individual portions of specific food types (vegetables/carbs/etc.) may be assessed. Additional food quantities such as calories, carbohydrates, sugars, etc. may also be entered, calculated, or determined by the program and/or the user.

The application may also permit a health coach to interact with the user. In an exemplary embodiment, the health coach may receive the picture taken of the meal to provide motivational encouragement, such as acknowledging changes that were made and implemented, and/or to provide suggestions or additional modifications, such as by suggesting fewer high carbohydrate options and instead identifying available substitutions. The health coach may be virtual, actual, or combinations thereof to provide real-time feedback to a user given inputs from the user into the system.

Thus, exemplary embodiments permit a user to track, analyze and modify lifestyle activities to achieve a desired goal. Embodiments described herein provide a personalized, automatic approach that uses the user's actual performance, preferences, and characteristics to achieve the desired goal. Embodiments described herein may provide a simple and convenient mechanism to track features that impact the desired goal such that a user may determine their success in altering these features, determine areas of improvement, receive personalized information, suggestions, and support corresponding to that success or lack thereof, and any combination thereof.

In exemplary embodiments, moderate to slight changes are suggested at intervals that are more likely to be adopted and maintained by a user. For example, a walking regiment may be started with just a few minutes a day. If the actual activity tracker indicates success, the additional minutes may be added at intervals. If the user does that meet the original or increased amount, on any given event or over an extended period, the application may query the user for a reason or provide one or more alternate suggestions that the user may be more inclined to meet.

FIG. 1 illustrates an exemplary set of core principles to create the desired behavioral change. For example, the behavioral change may be brought about by analyzing and using a person's motivation, ability, and triggers. In an exemplary embodiment, the motivation includes the user's mental state in wanting to change their behavior. The motivation may also include other mental considerations, such as the other strengths and weaknesses of the user in maintaining a desired behavior. In an exemplary embodiment, the ability is the actual behavior of the user. For example, this may include the user's ability to perform physical activities. The ability may be in fitness, nutrition, and wellbeing. The user's triggers may include environmental or personal actions that the user responds to. Therefore, triggers may be both internal and external. The combination of motivation, ability, and triggers are therefore used in conjunction to change a user's behavior.

As shown in FIG. 1, the triggers, both internal and external, either trigger certain actions of the user. The actions may be based on intuitive reactions or reasoned cost/benefit evaluation of the triggers. The actions will also be informed by the person's ability and timing urgency. If the desired action is achieved, then a reward program may be used to reinforce that action in the future. Finally, investment into the action or continuation of the action is also considered. Investment may include any actual action by the user, such as monetary, time commitments, overall improvement, as well as other costs/benefits perceived by the user either in past performance or continued performance. The triggers can be tailored based on what action/reward scheme the user actually responds to, so the continued investment to maintain the desired behavior is reduced. The lifecycle then curbs or controls the actions in response to the triggers, thus offsetting the original behavioral response.

Motivation is the important desire "to get us up and go". Staying on track is hard in part because motivation comes and goes. Exemplary embodiments may be designed to support a user to change to healthy habits with continuous, real time coaching, peer support and engaging mobile tools during the habit forming sixteen-week core phase and ongoing during the maintenance phase of the program. In both phases, a user may be rewarded by first taking control of their health and then by feeling better and healthier.

Education provides the user with the "reason why" and the "what to do". Exemplary embodiments incorporate "learning by doing", rather than having a user sit down in front of a computer or in a class. It's simply more engaging and memorable. The exemplary mobile application and coaches provide important tips on nutrition, fitness and well-being on a user's mobile device when the user needs it. Exemplary embodiments provide a personalized plan that is right for the individual user and goals. Under the supervision of a coach, a user may receive a personalized plan that is based on the latest diabetes prevention science and the user's individual profile, that is easy to follow and available through the mobile application.

Environment is the world we live in. It's filled with restaurants, grocery and drug stores and other venues that can either help us achieve our goals, or trip up our success in achieving them. Exemplary embodiments permit wellness brands to become partners with users in their journey to a healthier life. And to do so, exemplary embodiments permit wellness brands the opportunity to provide users with gift cards to stores like Safeway, Whole Foods, CVS and Foot Locker, retailers that are ready to support users as they pursue and meet their personal health goals.

Convenience is preferred because intuitive behavior prefers simplicity. Exemplary embodiments user an "Easier is Better" approach designed into a program to be simple—from the mobile tools that use familiar yet powerful features, to the content that includes simple yet science based best practices.

Figure 2:
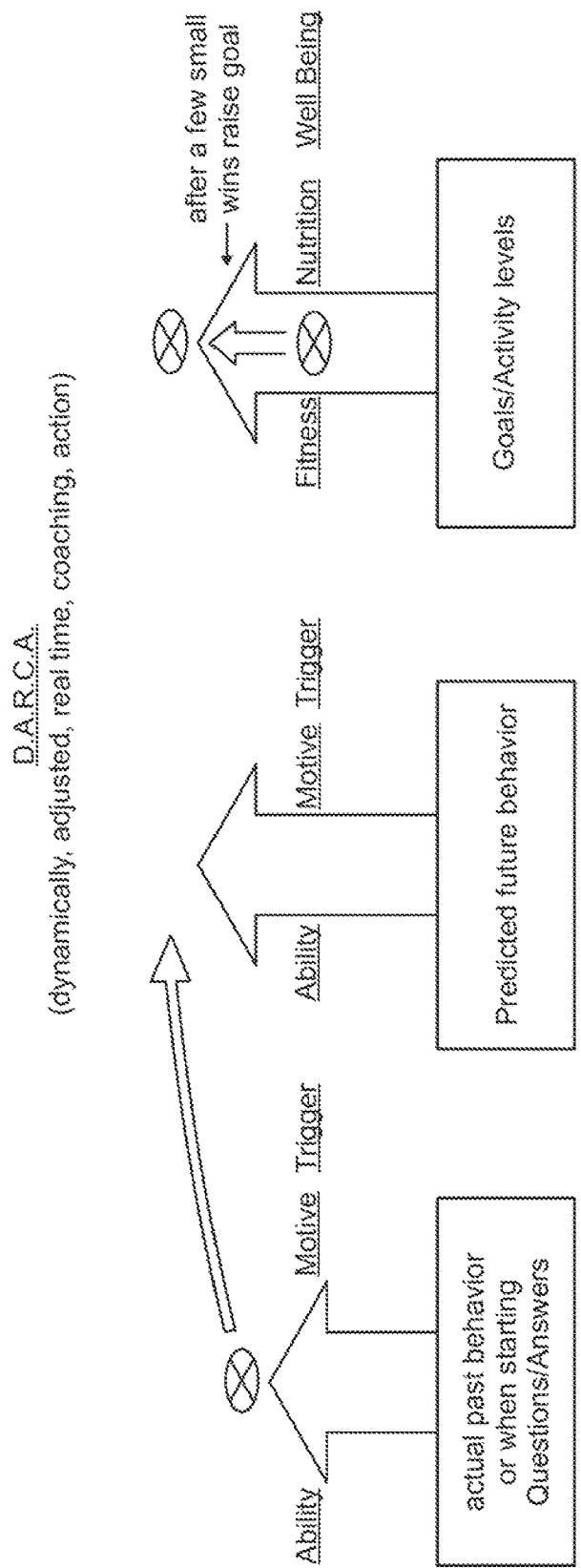

FIG. 2 illustrates an example high level dynamically adjusted, real time, coaching action as described herein. First, the user either tracks or enters past behavior, either through answering questions in a questionnaire, filling out statistics information, importing biological or tracking information from one or more devices, and combinations thereof. The data is then reviewed within one or more categories. As shown, the user's historical ability, motivation, and triggers are quantified. The system may permit the user to select a goal, or identifies a goal that is incrementally above the present overall present position of the user. After a few small achievements, the system and/or user may increment the overall goals to a higher level as the real time ability, motivation, and triggers evolve. The system analyzes personal information, including past performance and reactions of the user to predict future behaviors to achieve the goals and tailor the trigger/action path identified from FIG. 1.

Figure 3:
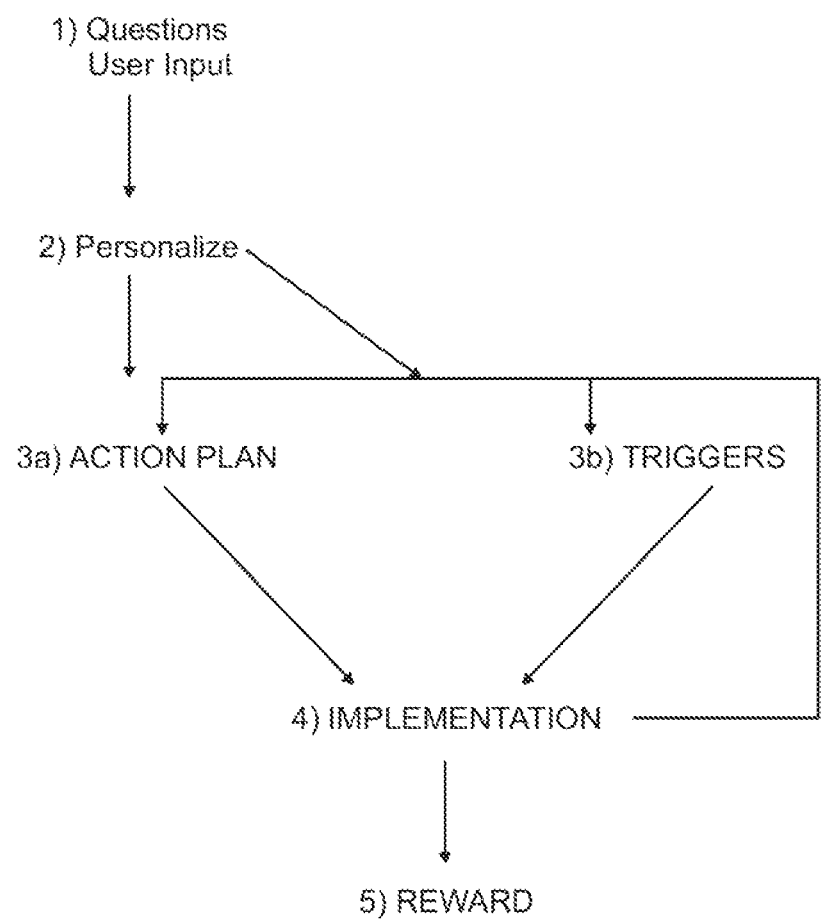

FIG. 3 is a specific exemplary algorithm to implement the dynamically adjusted, real time, coaching action exemplified in FIG. 2. The algorithm intakes information, personalizes the program to determine action and trigger plans for the specific user, to then be followed or tracked, and result in rewards to the user.

First, at step 1, the user is provided one or more options for entering personal information. In an exemplary embodiment, the user is presented with one or more questions in one or more categories. The one or more questions may be decided based on a decision tree such that questions are presented in a more progressive or specific fashion depending on one or more answers of previous questions. Exemplary categories include motivation, ability, triggers, nutrition, fitness, wellbeing, and combinations thereof. Motivation may include why the user is using the program; what the user wants to achieve; when are difficulties or weaknesses of the user that the user wants to change. The ability of the user may be their current fitness, nutritional, and wellbeing habits, such as food selection choices, caloric intake, exercise levels, etc. Triggers may be what actions or events create action for the user, either positive or negative. For example, a user may first be asked about a family history of type 2 diabetes as a starting question under the motivation to improve health, the progressive question may ask when the most difficult cravings set is. The questions under ability may include present activity, nutrition, or wellbeing levels. For example, the user may be asked about current activity levels and caloric daily intakes. The trigger questions may include questions about whether the user uses calendaring tools, or more progressive questions may include what makes it difficult for a user to eat less at dinner, or what stresses cause an eating response.

As step 2, the system personalizes the program to the individual user. As seen in FIG. 3, the system can determine a low, medium, or high qualitative level for the user in one or more categories, such as ability, motivation, trigger, fitness, nutrition, wellbeing, and combinations thereof. The system may then identify the weak and strong areas of the user to alter to provide customized triggers to make incremental adjustments in the actions of the user. The system may identify incremental improvements or goals associated with the one or more categories such that the user's behavior is altered within an easily manageable incremental iteration specific to the user. The system may modify the goal as successes are achieved to result in the overall larger behavioral modification.

At steps 3A and 3B, the system simultaneously identifies actions of the user and triggers of the user to affect user responses. Exemplary embodiments of curbing actions may include the portion control, calorie and activity trackers, as described herein. The actions may also include the action plan such as identify target activities, calorie limits, specific foods to increase, specific foods to avoid, suggested activities and levels, etc. The system may therefore track and identify deficiencies or surplus in nutrition, fitness, or wellbeing and provide specific tailored suggestions based on the present and expected future behavior of the user in response to the suggestions. At step 3A, therefore, a detailed plan of action is provided. The specific plan may include caloric limits, food type quantities, activities targets, etc. At step 3B, the system may include therapeutic remarks, advice, recommendations, messages to act and triggers for the user's benefit. For example, messages may be timed with specific user actions to remind a user to limit portion size or use the portion size control feature at or before regular meals, may include suggestions or recipes for meals, etc. The system may provide other messages or motivational triggers to achieve certain behavioral changes.

At step 4, the action plan is monitored and the results analyzed. For example, actual activity of the user is tracked and compared to the suggestions made. The action and triggers at steps 3A and 3B are therefore modified based on the response of the user in actual performance. Therefore, if the user has a propensity to modifying behavior given one set of suggestions but not another, continued suggestions may be made in line with the accepted behavioral changes instead of the rejected suggestions. For example, if a user accepts walking the stairs instead of taking the elevator, but does not start riding a bike instead of watching t.v., the action plan and motivational triggers may be altered consistent with the expected future behavior of the user. In this case, for example, additional action plan items may be modifying behavior already performed and merely extending actions already in progress, such as parking further from the office and walking instead of creating entirely new actions during a daily routine. Therefore, the actual action performed may inform and alter the action plan and triggers used to achieve the desired behavioral change.

At step 5, the system outputs variable rewards. The system may provide real-time personalized dynamically adjusted treatment plans. The real-time, dynamically adjusted therapeutic recommendations, motivations, and notifications may be personalized to the individual to achieve the desired behavioral changes of the individual. The system may provide real-time, activity based feedback through metrics, wellness rewards, etc. In an exemplary embodiment, rewards may include motivational messages from a social group or trainer or automatically generated by the system. Rewards may also include one or more illustrated metrics showing the success achieved by the user in altering behavior over time. The rewards may also include monetary incentives such as wellness related product discounts.

Exemplary embodiments may comprise a software application downloaded and stored on a mobile device such as a cell phone. The application may be stored in memory and executed by a processor. Interfaces may be displayed on the mobile device screen. Sensors, cameras, and other components of the mobile device may communicate with the application to provide exemplary features such as activity tracking, portion control, etc. External devices such as sensors, cameras, etc. may similarly be used to communicate either directly or indirectly with the application to provide desired information to the application. The application may also communicate over a network such as the internet to provide a support network of users, receive/send information and data to or from remote locations such as servers, processors, and databases to store, retrieve, analyze, compare, etc. data and information.

Exemplary embodiments therefore include an application to be run on a mobile or computer device and one or more monitoring devices. Monitoring devices may be biometric and/or activity monitors such as electronic devices configured to count steps, track sleep patterns, measure weight, etc. The electronic devices may communicate through wireless or wired channels to send and retrieve information to and from the mobile device through the application. In an exemplary embodiment, the application is configured to present the user one or more user interfaces configured to retrieve information from the user to provide past and present information about the user's ability, motivation, nutrition, activity, and wellbeing. The application is also configured to display information and messages to the user to provide a plan and triggers to curb the user's behavior. The application is also configured to permit real-time coaching by permitting communication with a trainer, such as through chat messaging or verbal recorded messages. The application is also configured to permit social peer groups to share results, messages, communications, information, etc. The application is also configured to permit user's to earn and receive rewards, such as coupons or discounts on wellness items. Any combination of features may be used as desired to obtain the desired behavioral changes.

Exemplary embodiments of the program may include one or more phases. In an exemplary embodiment, a first phase or core phase is used to create or define a new behavioral pattern. In an exemplary embodiment, a second phase or maintenance phase is used to maintain and encourage the continuation of the altered behavioral pattern created in the core phase.

In an exemplary embodiment, the first phase comprises a 16-week Core Phase. The core phase gets a user ready by setting profiles, personalizing the plan, receiving/setting up/downloading associated devices/trackers/programs (such as scale/pedometer/application). Over the course of the core phase, the user can receive information and support in key areas including nutrition, fitness, and wellbeing. Each week may be dedicated to a prearranged topic such as sleep, eating out, healthy foods and choices, alcohol/beverages, carbohydrates, etc. The different key areas may be related by topic or may address different lessons. Each week may be prearranged and generic to any user or may be specifically tailored to an individual user, including their characteristics, goals, actual performance, etc. Combinations of pre-arranged and targeted topics may be incorporated. In the case of targeted support and information, the program or coach may push information to the user based on their actual performance. For example, if the user's diet is heavy in carbohydrates, then a day or week lesson may be provided on identifying carbohydrates, replacing carbohydrates with other alternatives already appearing in the user's diet or similar thereto, suggesting portion reductions when carbohydrates are identified, providing support and reminder messages to avoid certain foods when they are likely to be consumed or providing alternatives that may be available when the food to avoid is likely to be consumed, etc.

A specific embodiment is now provided to illustrate specific features and algorithms described herein. The following describes the unique features and the underlying algorithm of an exemplary embodiment. Four drawings will be referenced here that are attached (FIGS. 1-3 and 5).

An exemplary technology platform is provided herein that enables consumers to make the necessary lifestyle changes to prevent and manage disease. An exemplary disease may be Diabetes and specifically the condition called prediabetes. Other diseases may include heart disease, obesity, and stroke. This technology platform places the consumer in the center of the ecosystem connected to the mobile app, which is a behavior change tool based on the latest behavior economics and diabetes prevention science. The ecosystem of partners consists of wearable tech companies such as Apple, Samsung and Fitbit providing body sensor and display technologies. It also includes health providers such as progressive private practices and hospitals and consumer product wellness brands and wellness retailers such as Safeway, Whole Foods, CVS, Walgreens, Foot Locker, The Chopra Center. Payers such as health insurance companies and employers may also be important participants.

Exemplary embodiments are built in a "Mobile First" environment to promote an on the go behavior change and includes a coach service center to effectively deliver and scale lifestyle intervention for millions of users. The health goals of weight loss, increase in physical activity and improved emotional wellbeing are delivered to a user in a convenient interface. Below is an exemplary underlying algorithm and feature translation.

For behavior change to occur, motivation, education (ability) and triggers (external environment and internal triggers) have to come together with a high time based urgency for the individual to act. Furthermore, as illustrated in FIG. 1, in order to make the behavior change a consistent habit, short term and long term rewards need to be built in that work both on the intuitive, subconscious, emotional level as well as on the conscious, cost/benefit level. Convenience is built in by providing the user a simple solution that does not require willpower on an ongoing basis, but is rather executed on the subconscious, intuitive level leading to the result of creating healthy habits.

These principles have been uniquely applied in an exemplary model illustrated by FIG. 2. The model includes past behavior, analyzed using behavior economics and predicts future behavior and the most effective lifestyle interventions to form consistent healthy habits in the least intrusive and most expedited way. At the heart of the algorithm is the "personalizer" or healthy behavior matrix (FIG. 3, also illustrated in exercise punnett squares FIG. 5). It evaluates a person's motivation, ability and trigger on dimensions of fitness, nutrition and emotional wellbeing over time (FIG. 2) resulting in a weighted scoring system that analyzes past behavior, predicts future behavior and produces personalized digital therapy recommendations.

At the beginning of the program, the consumer answers profile questions that indicate ingoing motivation, ability and trigger levels on fitness, nutrition and wellbeing. This data and its resulting scores leads to a personalized plan covering the three wellness dimensions (FIGS. 2-3), and therapeutic real time interventions/recommendations, and activity based feedback and rewards. Importantly, this algorithm is performing dynamically adjusted, real time, coaching actions or D.A.R.C.A. (FIG. 2). This means that as the user's motivation, ability and triggers are changing, say progressing from an early stage to a more advanced stage, or cycling through erratic periods, the program, digital therapeutic recommendations and rewards are dynamically adjusting to the optimal levels for habit formation. On an ongoing basis, actual past behaviors to program recommendations, rather than profile questions will drive future recommendations.

The underlying software uses Big Data, predictive and artificial intelligence modeling. The lifestyle interventions are modeled as to what a human coach would execute, however are much more powerful in speed, scale and accuracy. The biggest challenge is displaying empathetic coaching behavior. The healthy days software goal as to scale is to enable a minimum coverage level of one human coach to 500 consumers.

Exemplary embodiments may be configured to drive maximum user engagement, and may comprise the following combination of product features on their own and as a whole system, and any combination thereof:

Personal Health Coaching: An exemplary embodiment may implement a unique fusion of human intervention via instant coaching and technology via mobile hot triggers such as texting, calendaring and photo taking This unique blend may be used to provide higher effectiveness of health outcomes.

Meal Feature: The nutrition feature comprises taking a picture of a meal, digital portion control, instant coach nutrition feedback, and combinations thereof. The ensuing personal relationship of coach and member enables the accountability feeling of the member who is motivated to improve their health outcomes.

Digital Sizing and Digital Portion Control Description: Exemplary embodiments includes an easy and engaging way for consumers to "take measure" of an object by simply taking a photograph. The first application will come in the form of a Digital Portion Control within the mobile application.

Portion control is a clinically proven way to reduce weight. The food and diet industries have applied it in the form of 100 calorie packs, portion controlled frozen meals and small plate movements. A person tends to over-serve onto larger plates, and because people consume an average of 92% of what they serve themselves, larger plates lead to larger food intake. A two inch difference in plate diameter—from 12" to 10" plates—would result in 22% fewer calories being served, yet it is not drastic enough to trigger a counteracting response. If a typical dinner has 800 calories, a smaller plate would lead to a weight loss of around 18 pounds per year for an average size adult.

Digital portion control enables the consumer to eat the right amount of food by ensuring the food on a plate is within a 9 inch diameter as measured through a camera lens. It may be logged and communicated by taking a picture with a mobile device. Exemplary embodiments provide instant feedback about portion size via the "ruler like" circle on the camera screen that the user holds over the food making sur that the food on the plate fits inside the circle (green zone). If the food is +0.5 inches outside the circle (yellow); if the food is +1 inch outside circle (red). The camera will need to autofocus in a way that allows the green circle to always match a 9 inch food diameter and be in focus. If a user tries to adjust closer or farther, the picture gets out of focus. The user can adjust the portion size right away if necessary and then take the picture as a log of a right sized portion. Exemplary embodiments may determine a portion size of the foodstuff on the plate by providing a circle corresponding to a desired plate size on the display of the mobile device overlaid on an image of the plate containing a foodstuff. The circle may be used to create a scale on the display correlating the displayed image size to a physical size of the desired plate size. The correlation may be created by a predefined, static focal length of the camera where the image of the plate containing a foodstuff is in focus when the scale corresponds to a predefined relationship between a size of the circle and the physical size of the desired plate size and the image of the plate containing the foodstuff is out of focus outside of focus when the scale does not correspond to the predefined relationship. The features of the lens view are such that the color coding is apparent as the user looks through the lens at the food. A real time diameter counter on the side of the lens may be used to inform the consumer of the actual size of the food as s/he zooms in or out and fits the now out of focus food into the circle. The logged picture will be analyzed for portion size by a nutrition trained lifestyle coach who provides a color coded feedback message to the consumer. Digital portion control may be combined with a spectrometer for additional nutritional analysis and feedback of the food that the user is about to consume.

Other applications can be found in clothing where online shoppers will be able to upload and submit a picture of themselves with their order to ensure the right size of the garment. Exemplary embodiments may allow for 3D sizing to capture various planes of the human body.

Calendarization: Exemplary embodiments use the calendaring, reminder and notification systems that are simple yet powerful in creating routines. Research shows that people (with Diabetes) that are more organized have higher compliance rates with doctor's therapy's and medication schedules and hence show improved outcomes than people that are not.

Messaging: An exemplary feature set is the peer to peer interaction of users exchanging information and sentiments, as well as consumer to coach private messaging. Powering the social need and behavior pattern will enable the "Education" (ability) function, the "Motivation" function, as well as the internal "Triggers" to be activated. Having this ability in real-time at the "point of action" (POA), say during meal consumption, or on a brisk walk will drive up consumer relevance to a high level.

Personalized Program (Program tab): Having content and progress tracking that is personalized and always current at your fingertips in a mobile environment is increasing engagement and Education.

Rewards: To connect the physical environment into a supporting network for the consumer's journey to a healthier life, exemplary embodiments enable wellness brands to participate in a rewards program. This will ensure consumer loyalty exemplary embodiments, to healthy habits and also begin to change the consumer's commercial ecosystem towards healthier offerings impacting society on a more macro level. In turn, this healthier eco system will stimulate healthier behavior by consumers driving a positive cycle further.

Figure 4:
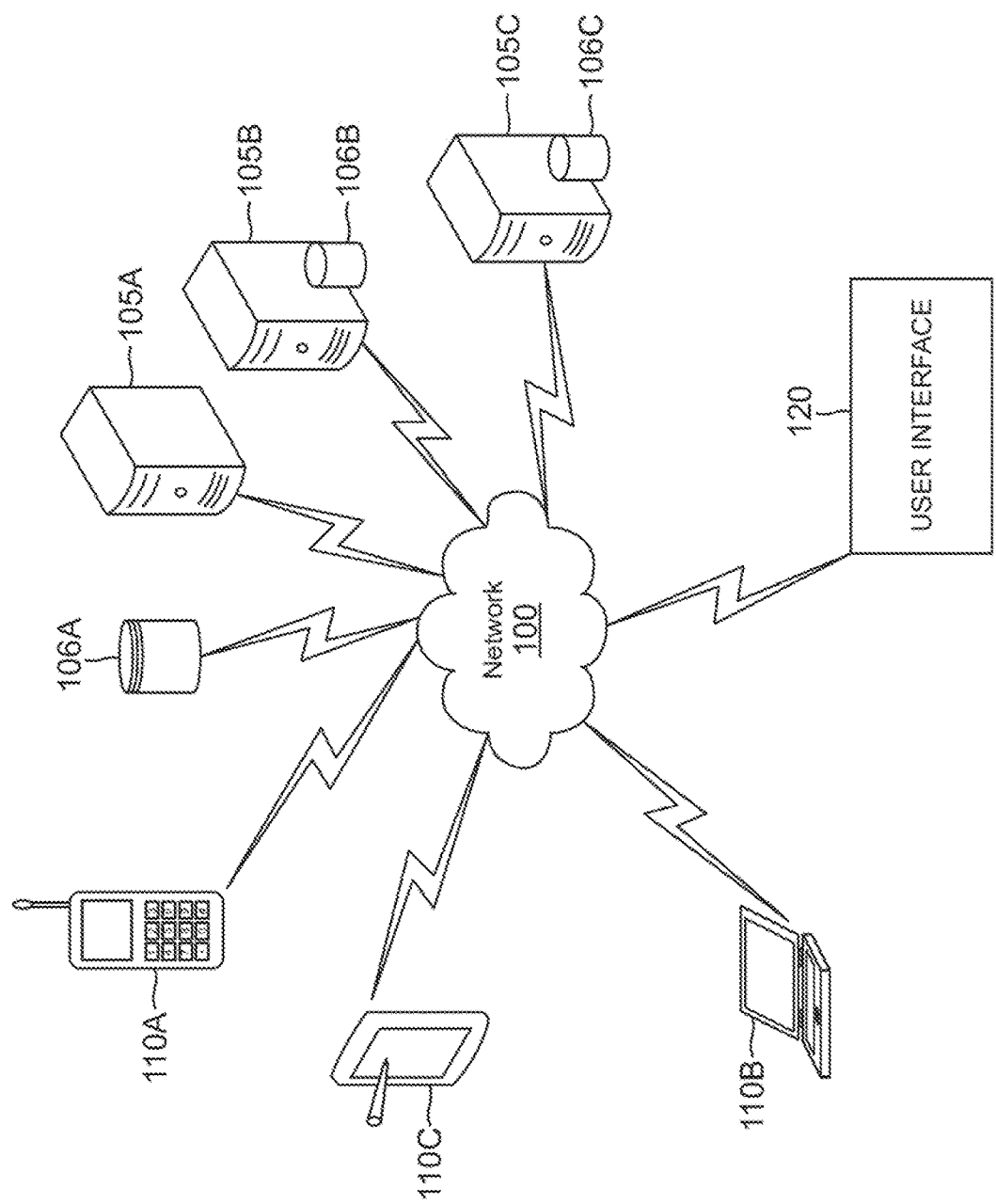
FIG. 4 illustrates a diagram of an embodiment of a client-server network environment to implement the on-line system according to embodiments described herein.

FIG. 4 illustrates a diagram of an embodiment of a client-server network environment to implement the system according to embodiments described herein. An application resident on the client device 110A-110C presents a user interface 120 through the display of the client device, and communicates over a network 100 with one or more servers 105A-105C and their databases 106A-106C. This client device-server system is configured to enable a user of the client device 110A-110C to implement the system, including, but not limited to, entering in personal information; interfacing/communicating with support networks; entering or receiving information about the user, their journey, and their goal, to be stored, tracked, and analyzed; displaying information to a user consistent with a location along their journey; analyzing data and suggesting individual behavioral changes based on the actual behavior of the user that indicate the changes more likely to be adopted by a user; and combinations thereof. The client devices such as a smart phone 110A, personal digital assistant/tablet 110B, laptop computer 110C may have a browser to execute the application or may have a resident application executed by the client device scripted to run the system and cooperate or communicate with a remote server or computer.

A database, such as a first database 106A, maintains a database for storing one or more attributes of the system. When the server 105A is an internet site, the server may be comprised of at least one or more servers and cooperating databases. This new, simple, platform enables anyone to store personalized information conveniently and efficiently from any number of locations. One or more modules, such as a client application on the mobile client device or server applet resident on the server, may be configured to present an interface to support the intake and output of information for one or more of the functions described herein. The client application may have code scripted to present one or more user interface templates that may be user customizable, have one or more prompted input fields, and/or is configured to work with a browser and a remote server. The server applet works with a browser application resident on the client device and serves one or more web pages to the client device with the resident browser. Communication with remote devices, servers, computers, users, mobile devices, databases, etc. may be in real time or may be at periodic intervals as dictated by the needs and associated functions of the communicated information.

Referring to FIG. 4, each client device 110A-110C can communicate the content entered into the various user interface fields to set or populate one or more attributes of the database over the network to the server 105A-105C potentially located on the World Wide Web. A software program resident on the server, such as the first server 105A, takes in the entered details. The backend server aggregates the information. The information is passed to the database. The database may receive, store, and disseminate information, such as, for example, about the user, dietary, behavioral and/or activity habits, etc. The server may be used to communicate and update information stored in the database and communicate to or with one or more associated users in response to the received information. Thus, a software program resident on the server is coded to take in the details from one or more users, assess the information received, and perform specific functions in response to the received information. The server may then supply information back to each client device to be displayed on a display screen of that client device as well as supply information back to one or more other networked users, such as the support network, coach, and/or doctor, etc. The web application on the server can cooperate over a wide area network, such as the Internet or a cable network, with two or more client machines each having resident applications.

In an embodiment, the software used to facilitate the protocol and algorithms associated with the process can be embodied onto non-transitory machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. Any portion of the server implemented in software and any software implemented on the client device are both stored on their own computer readable medium in a non-transitory executable format. Embodiments described herein, such as modules, applications, or other functions may be configured as hardware, software, or a combination thereof. The configuration may be stored one a single dedicated device such as an application locally resident and executed on mobile devices 110A-11C configured to communicate over a network or across many devices such as a website hosted across one or more servers 105A-C retrieving information across one or more databases 106A-C, to communicate across a network 100 to a local device, such as laptop 110B, or any combination thereof. Embodiments may also take advantage of cloud computing, such that the exemplary modules, applications, or other functions are stored remotely on one or more servers or devices, and accessed over a network such as the internet or other network connection from an electronic device, such as a mobile device.

While some specific embodiments of the invention have been shown the invention is not to be limited to these embodiments. For example, most functions performed by electronic hardware components may be duplicated by software emulation, and vise verse. Thus, a software program written to accomplish those same functions may emulate the functionality of the hardware components in input-output circuitry. The invention is to be understood as not limited by the specific embodiments described herein, but only by scope of the appended claims.

For example, exemplary embodiments are provided in terms of one or more modules, functions, or interfaces. These modules, functions, or interfaces are explained as separate operating units for simplicity and are not intended to be so limited. Instead, these features may be combined, separated, integrated, or otherwise redefined in any configuration to perform one or more functions or attributes described herein. Therefore, different modules may perform one or more of the desired functions. The modules may be combined and integrated so that the two described modules are performed by a single module. Similarly, as recited in the claims, the indication of a first, second, or other object, feature, interface, module, etc. is intended to distinguish functions and does not indicate a quantity or separate entity. Instead, as long as one or more objects, features, interfaces, modules, etc. are present including the recited functions, the first, second, or other is present in the system. Similarly, embodiments described as occurring on any one electronic device, mobile device, server, or network may be performed by any other device, may be performed on a single device, or may be performed across devices.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A system comprising: one or more processors, one or more memory, a camera in communication with the one or more processors, and a communication link, wherein the one or more memories have stored thereon machine readable instructions that when executed by the one or more processors are configured to perform the functions of:
    obtain an image of a plate containing a foodstuff with the camera on a mobile device;
    communicate the image over the communication link to a remote device for inspection by a coach;
    receive feedback from the coach after analysis of the image by the coach;
    display a feedback message on a display of the mobile device based on the received feedback; and
    determine a portion size of the foodstuff on the plate by providing a circle corresponding to a desired plate size on the display of the mobile device overlaid on the image of the plate containing a foodstuff, the circle creating a scale on the display correlating the displayed image size to a physical size of the desired plate size, wherein the correlation is created by a predefined, static focal length of the camera where the image of the plate containing a foodstuff is in focus when the scale corresponds to a predefined relationship between a size of the circle and the physical size of the desired plate size and the image of the plate containing the foodstuff is out of focus outside of focus when the scale does not correspond to the predefined relationship.

2. The system of claim 1, wherein the feedback is a color coded feedback by turning the circle green if the image corresponds to an approved meal for a user.

3. The system of claim 2, the functions further comprise receiving additional feedback from the coach in the form of text messages displayed on the display of the mobile device suggesting alternatives to the user.

4. The system of claim 3, wherein the color coded feedback is turning the circle red if the image corresponds to an unapproved meal for the user.

5. The system of claim 4, wherein the portion size is used to determine whether the meal is approved or unapproved.

6. The system of claim 5, wherein the desired plate size is a 9 inch diameter plate.

7. A method comprising:
    obtaining an image of a plate containing a foodstuff with a camera on a mobile device, wherein the image of the plate containing the foodstuff is in focus;
    communicate the image over a communication link of the mobile device from the mobile device to a remote device;
    inspecting the image at the remote device by a coach;
    receive feedback at the mobile device from the coach after analysis of the image by the coach;
    display a feedback message on a display of the mobile device based on the received feedback; and
    determine a portion size of the foodstuff on the plate by providing a circle corresponding to a desired plate size on the display of the mobile device overlaid on the image of the plate containing a foodstuff, the circle creating a scale on the display relating the displayed image size to a physical size of the desired plate size and the scale is created by a predefined focal length of the camera where the image of the plate containing a foodstuff is in focus when the scale corresponds to a predefined relationship between a size of the circle and the physical size of the desired plate size and the image of the plate containing the foodstuff is out of focus outside of focus when the scale does not correspond to the predefined relationship.

8. The method of claim 7, wherein the feedback comprises turning the circle green if the image corresponds to an approved meal for a user.

9. The method of claim 8, further comprising receiving additional feedback from the coach in the form of text messages displayed on the display of the mobile device suggesting alternatives to the user.

10. The method of claim 9, wherein the color coded feedback is turning the circle red if the image corresponds to an unapproved meal for the user.

11. The method of claim 10, wherein the portion size is used to determine whether the meal is approved or unapproved.

12. The method of claim 11, wherein the desired plate size is a 9 inch diameter plate.

13. The method of claim 7, wherein the known diameter is a nine inch plate diameter.

14. The method of claim 1, wherein the known diameter is a nine inch plate diameter.

* * * * *